(12) United States Patent
Kitahara et al.

(10) Patent No.: US 6,595,819 B1
(45) Date of Patent: Jul. 22, 2003

(54) EQUIPMENT FOR FABRICATING PARTITIONING RIBS OF PLASMA DISPLAY DEVICE

(75) Inventors: Toshihiro Kitahara, Tachikawa (JP); Hiroshi Hashi, Tokyo (JP); Akihiro Kubota, Kokubunji (JP); Susumu Kobayashi, Sayama (JP); Hidetoshi Yamada, Tokyo (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/572,426

(22) Filed: May 16, 2000

(30) Foreign Application Priority Data

May 21, 1999  (JP) .............................................. 11-142144

(51) Int. Cl.[7] .......................... H01J 9/24; B29C 41/08
(52) U.S. Cl. ........................ 445/24; 118/624; 118/625; 239/695; 239/706; 264/255; 264/308; 264/434; 264/484; 264/614; 264/681
(58) Field of Search ............................. 445/24; 118/620, 118/624, 629, 625, 50.1; 239/690, 706, 695, 696; 427/68, 475; 264/434, 484, 614, 681, DIG. 57, 255, 308

(56) References Cited

U.S. PATENT DOCUMENTS 4,710,849 A * 12/1987 Norris .......................... 239/690
4,748,043 A * 5/1988 Seaver et al. ................ 118/630
4,829,996 A * 5/1989 Noakes et al. ........... 128/200.14
6,146,567 A * 11/2000 Sachs et al. ................. 118/313
6,160,345 A * 12/2000 Tanaka et al. ............... 313/489

FOREIGN PATENT DOCUMENTS

JP           2679036          8/1997
JP           2716013          11/1997

* cited by examiner

Primary Examiner—Kenneth J. Ramsey
(74) Attorney, Agent, or Firm—Straub & Pokotylo; John C. Pokotylo

(57) ABSTRACT

This invention provides equipment for fabricating partitioning ribs of a plasma display device. The equipment comprises a head, a driver, an X position sensor and a Y position sensor, a laser displacement sensor for detecting the distance of the head from a glass plate or substrate, a motor and a motor driver for moving the head relative to the glass plate, and a CPU for controlling various circuits. The head has nozzle members for ejecting partitioning rib grains by an electrostatic ejection method or ink jet technology to form partitioning ribs. The driver controls the volume of the partitioning rib grains ejected from the head. The X and Y position sensors detect the position of the head relative to the glass plate within a plane.

19 Claims, 16 Drawing Sheets

LD
SD

FIG.31A
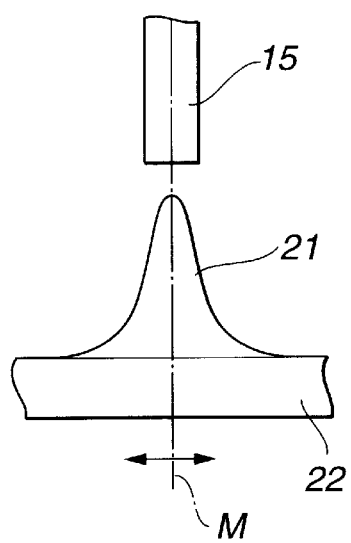
FIG.31B
FIG.32A
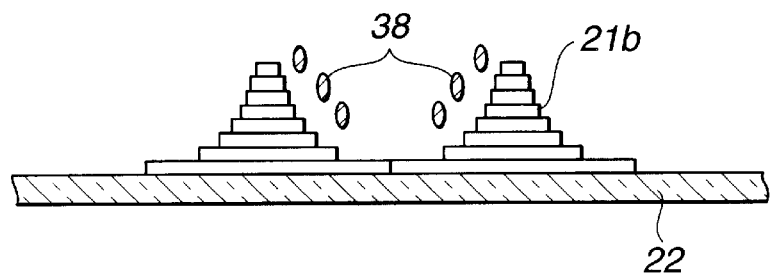
FIG.32B
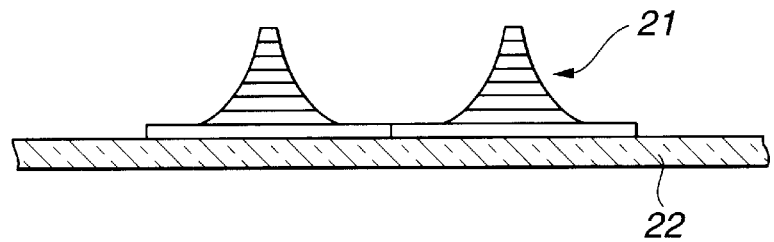
FIG.33A
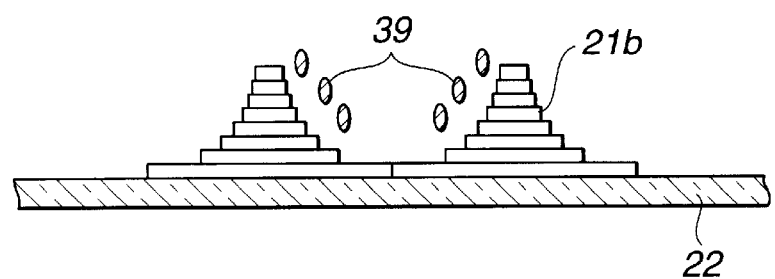
FIG.33B
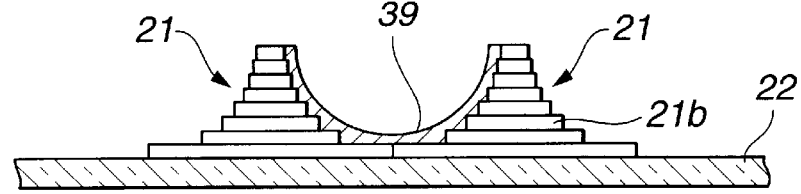

FIG.34
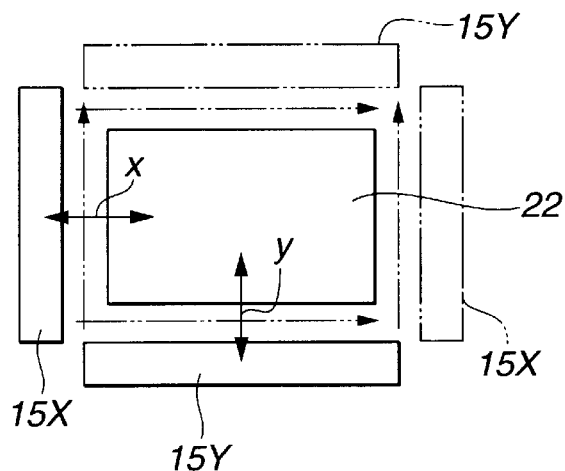
FIG.35A FIG.35B FIG.35C
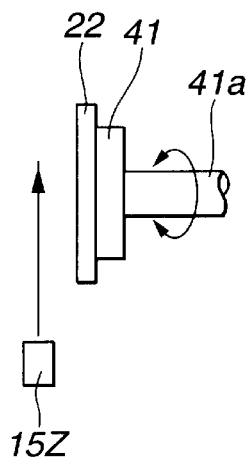 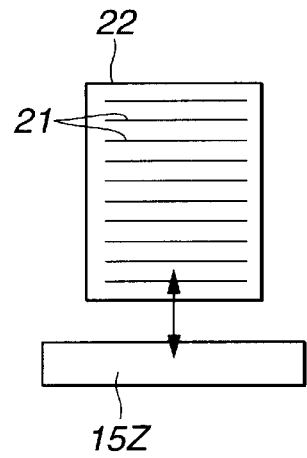 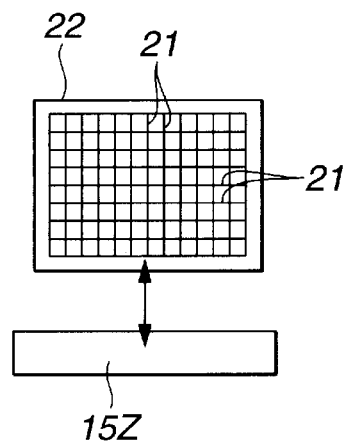
FIG.36A FIG.36B
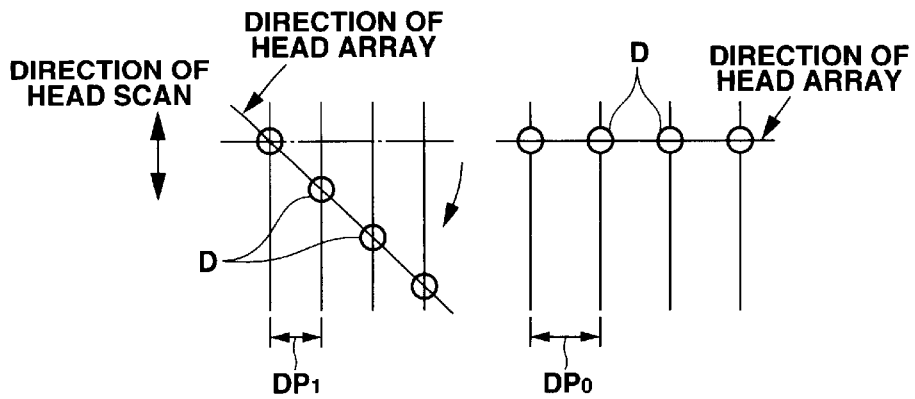

EQUIPMENT FOR FABRICATING PARTITIONING RIBS OF PLASMA DISPLAY DEVICE

BACKGROUND OF THE INVENTION

1. Field of the Invention

The present invention relates to equipment for fabricating partitioning ribs of a plasma display device and, more particularly, to equipment for fabricating partitioning ribs by ejecting partitioning rib grains to form partitioning ribs.

2. Description of the Related Art

In recent years, flat panel displays have attracted attention as display devices that can achieve space saving instead of CRTs (cathode-ray tubes) that have been widely used heretofore.

Various types of flat panel displays of this kind are available such as liquid-crystal displays (LCDS), plasma display panels (PDPS), field emission displays (FEDS), organic EL displays (ELs), and light-emitting diodes (LEDs). They are used separately according to application. Today the LCD enjoys the most widespread acceptance.

Larger screen areas and wide viewing angles can be more easily imparted to plasma display devices than the LCD described above. For these and other advantages, the plasma display device is one of devices that attract the greatest attention in the field of large-sized displays providing full color display.

Such a plasma display device is fabricated by forming a number of elongated data electrodes on a back substrate consisting of a glass plate or the like, forming partitioning ribs in the form of stripes on the opposite sides of the data electrodes, and forming a phosphor layer in the cells surrounded by the partitioning ribs.

Then, a number of elongated bus electrodes and transparent electrodes are placed vertical to the data electrodes. A front plate is placed from above to cover these electrodes. A mixture gas of rare gases such as He, Ne, and Xe is sealed into the discharge gas spaces surrounded by the partitioning ribs.

When a display is provided by such a plasma display device, if an AC pulse is applied between adjacent transparent electrodes, a gas discharge is produced, creating plasma inside the discharge gas spaces. The resulting ultraviolet radiation excites the phosphors, giving rise to visible light.

The aforementioned partitioning ribs are formed like stripes in the case of the AC type PDP. In the case of the DC type PDP, partitioning ribs are formed like cells.

The partitioning ribs are formed on the aforementioned glass plate or panel by some means described below but all of these means suffer from problems associated with read time and accuracy:

(1) Lift-off method (photoengraving): Read time is 135 minutes. The rib width cannot be thinned greatly.

(2) photosensitive paste method (photo-insulator method): Read time is 113 to 333 minutes. It is impossible to reduce the rib width greatly. Furthermore, the accuracy of the rib height is not very good.

(3) photosensitive film method: Read time is 135 minutes. The rib width cannot be reduced greatly.

(4) Sandblasting: Read time is 58 to 142 minutes. It is impossible to reduce the rib width greatly.

(5) Screen printing method: Read time is 128 to 192 minutes. The rib width cannot be reduced greatly. In addition, the accuracy of the rib height is not very good.

(6) Pressure molding: Read time is as short as 17 minutes. Ribs can be processed accurately. However, molding equipment is necessary.

Currently, screen printing and photolithography are predominant and will be hereinafter described in detail. In either case, the formed partitioning ribs cannot be shaped into an ideal cross-sectional shape in accordance with an embodiment of the present invention, the embodiment being described in connection with FIGS. 13 and 14.

Screen printing is used to print a partitioning rib pattern on a glass plate or panel by means similar to printing, using a mesh screen made of a metal or resin. A process consisting of this printing and drying is repeated about 10 times to form partitioning ribs about 1 mm tall. Finally, they are sintered. This method has the advantage that undesired wasteful material is not produced. However, the shape and the dimensions of the partitioning ribs cannot be fabricated accurately. Furthermore, the mesh is elongated, requiring frequent exchange. In this way, various difficulties occur. In addition, high accuracy cannot be secured unless the screen length is about three times the length of the printed pattern and so the equipment is made huge.

On the other hand, photolithography consists of printing a thick-film paste uniformly over the whole glass plate, sintering the paste, applying a photoresist, stacking photomasks having burn-in patterns over each other, and developing the photomasks. The developed burn-in patterns are etched away. Also, with this method, the process consisting of printing, drying, and exposure is repeated about 10 times. Finally, sintering is done. This method can form partitioning ribs with better shapes and accuracy than the aforementioned screen printing. However, it must be said that this method still has drawbacks. Furthermore, production process results in a large amount of wasted materials. Hence, the method is wasteful. From a viewpoint of equipment, considerable production space is necessary because exposure system and development (etching) system must be added to the above-described screen printing system.

After forming the partitioning ribs described above, phosphors are applied. Some methods are available to apply the phosphors. Today, the main means for applying the phosphors are screen printing and photolithography.

In the former screen printing, one plate is fed in steps corresponding to colors of R, G, and B. Thus, the various colors are printed. This method has the advantage that the process sequence is simple and the phosphor materials produce only small amounts of loss. However, the method presents some problems, e.g., sufficient dimensional accuracy cannot be obtained, and mixing of colors results.

In the latter photolithography, the process sequence consisting of printing, exposure, and development is repeated three times for the three colors of R, G, and B. This method can provide somewhat higher accuracy than the screen printing. However, the process sequence is complicated and so considerable production space is necessitated. Furthermore, this method has some drawbacks such as production of large amounts of loss of materials.

Specific examples of techniques associated with application of the phosphors and formation of the partitioning ribs are as follows.

For example, Japanese Patent Publication No. 2679036 describes a technique for applying phosphors to form partitioning ribs by ink jet technology. The technique described in this Patent Publication is intended to cause phosphor materials to adhere to the exposed surface of the substrate that is at the deepest locations around the partitioning ribs.

The technique for applying phosphors as described in this Patent Publication No. 2679036 provides a process step different from the step for forming partitioning ribs. Therefore, this technique does not contribute to improvement of the production efficiency. Furthermore, the phosphors are not applied to the surfaces of the partitioning ribs but to the substrate at the deepest locations around the partitioning ribs.

Japanese Patent Publication No. 2716013 describes a technique for forming grooves in a glass plate or substrate whose surface has been blackened to form partitioning ribs between the grooves. Since insulator layers can be omitted, the structure and the production method are simplified.

However, in the technique described in this Patent Publication No. 2716013, it is necessary to process glass accurately. Hence, it is difficult to form partitioning ribs of ideal shape.

In any of the techniques described in the above-cited Patent Publications, partitioning rib material is not ejected from nozzle members.to form partitioning ribs.

In the above-described conventional techniques, it is impossible to fabricate partitioning ribs having accurate shape and dimensions with relatively small-sized production equipment. Consequently, there is a demand for techniques achieving this.

OBJECT AND SUMMARY OF THE INVENTION

It is an object of the present invention to provide equipment for fabricating plasma display panel (PDP) partitioning ribs with accurate shapes and dimensions with relatively small-sized equipment.

In summary, this invention provides equipment for fabricating partitioning ribs for a plasma display panel or device. This equipment includes heads having nozzle members for ejecting partitioning rib grains to form the partitioning ribs.

This object and advantages of the invention will become apparent from the following detailed description.

BRIEF DESCRIPTION OF THE DRAWINGS

FIGS. 12A and 12B are views comparing dots formed by the multi-head subassembly in accordance with the embodiment described above with dots formed by the prior art heads for use in a printer or the like;

FIGS. 31A and 31B are perspective views of the embodiment described above, showing the manner in which partitioning ribs are shaped into a desired form by vibrating a head minutely;

FIGS. 32A and 32B are views of the embodiment described above, showing the manner in which the surfaces of partitioning ribs are smoothed by the use of a finishing material having no affinity with the material of the partitioning ribs;

FIGS. 33A and 33B are views of the embodiment described above, showing the manner in which the surfaces of partitioning ribs are smoothed by the use of a finishing material having an affinity with the material of the partitioning ribs;

FIG. 34 is a plan view showing the arrangement of a glass plate and a head for forming grid-like partitioning ribs in the embodiment described above;

FIGS. 35A, 35B, and 35C are a side elevation and plan views, respectively, of the embodiment described above, showing other equipment for fabricating grid-like partitioning ribs of a plasma display device; and FIGS. 36A and 36B are diagrams of the embodiment described above, and in which the pitch between adjacent partitioning ribs is made variable by tilting a head from the direction of scan of the head.

DEETAILED DESCRIPTION OF THE PREFERRED EMBODIMENTS

Figure 1:
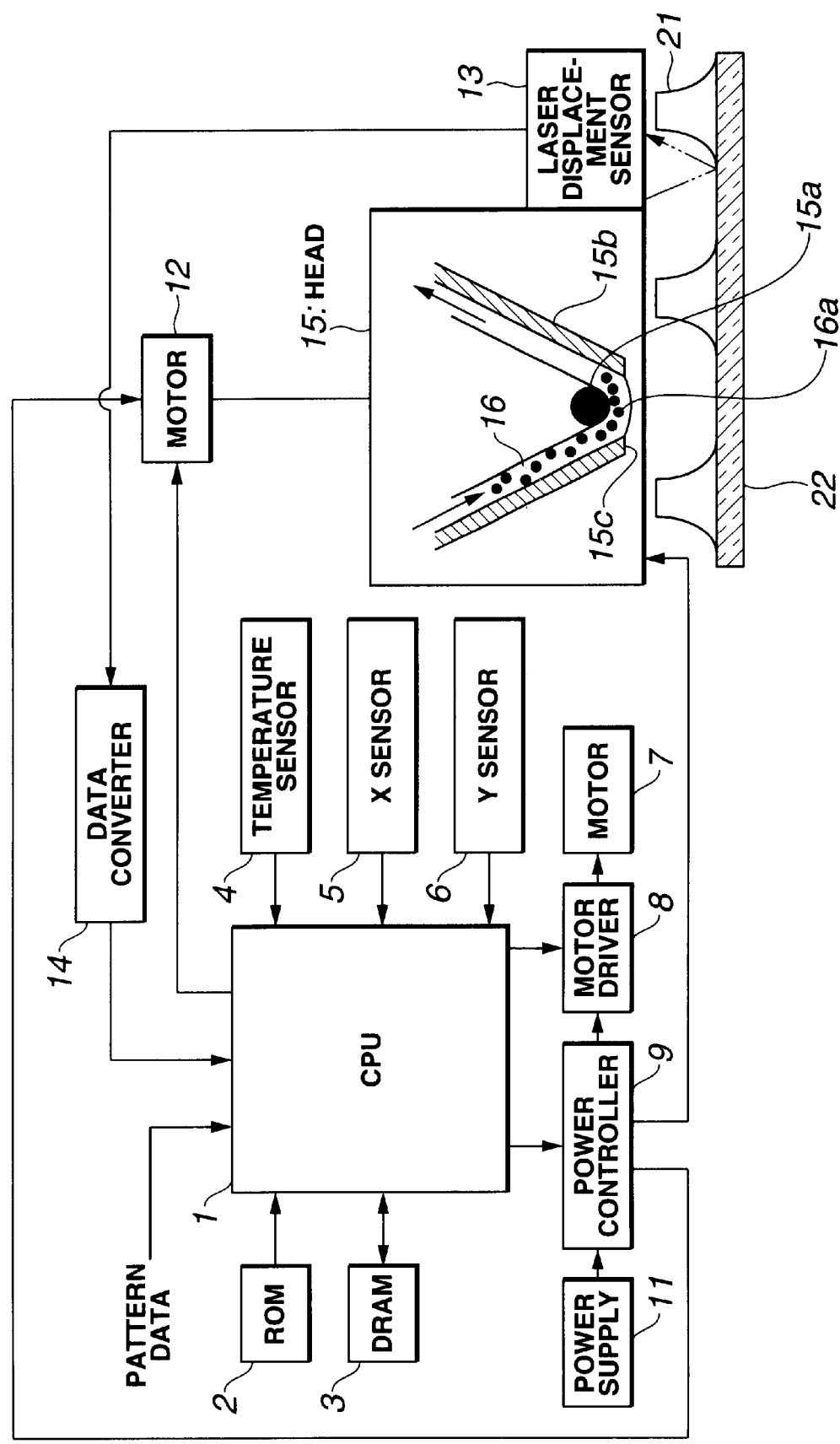
FIG. 1 is a principally electrical block diagram of equipment for fabricating plasma display panel (PDP) partitioning ribs, the equipment being in accordance with one embodiment of the present invention.

Embodiments of the invention are hereinafter described by referring to the drawings.

FIGS. 1–36B show one embodiment of the present invention. FIG. 1 is a block diagram mainly showing the electrical configuration of equipment for fabricating partitioning ribs of a plasma display device.

As shown in FIG. 1, this equipment for fabricating the partitioning ribs of the plasma display device comprises a head 15 for forming partitioning ribs 21 on a glass plate or substrate 22, a driver 12 that is an ejection voltage control means and an ejection amount control means for controllably driving ejection of partitioning rib grains from the head 15, a laser displacement sensor 13 that is a head distance control means for measuring the relative distance between the head 15 and the glass plate 22, a data converter 14 for performing processing such as conversion of the results of the measurement made by the laser displacement sensor 13 into digital data, a temperature sensor 4 for measuring the temperature of the head 15, an X position sensor 5 for measuring the x-direction position of the head 15 relative to the glass plate 22, a Y position sensor 6 for measuring the relative y-direction position of the head 15 on the glass plate 22, an electric motor 7 for moving the x-direction position or the y-direction position of the head 15 or the distance from the glass plate 22, a motor driver 8 for controlling and driving the motor 7, a power supply 11 for supplying electric power for this equipment for fabricating the partitioning ribs of the plasma display device, a power controller 9 for supplying the electric power from the power supply 11 to various circuits including the motor driver 8, the head 15, and the driver 12, a ROM 2 in which a program for fabricating the partitioning ribs, a table used for conversion of a pattern data (described later), corrective data, and so on are stored, a DRAM 3 acting as a working store space in executing the program for fabricating the partitioning ribs of the plasma display device, and a CPU 1. This CPU 1 receives input pattern data and data from the temperature sensor 4, from the X position sensor 5, from the Y position sensor 6, and from the laser displacement sensor 13, and controls the head 15 and the motor 7 via the driver 12 and via the motor driver 8 in accordance with the program for fabricating the partitioning ribs of the plasma display device to fabricate the partitioning ribs 21 on the glass plate 22.

The operation of the equipment constructed in this way to fabricate partitioning ribs of a plasma display device is as follows.

If pattern-data about the cross-sectional shape of the partitioning ribs, the pitch between individual partitioning ribs, and so on are entered into the CPU 1, this CPU 1 first stores the pattern data in the DRAM 3 described above temporarily.

The CPU 1 rearranges the pattern data into data about those ejected by the head 15 such as the number of heads and the number of lines and reads the data successively. For instance, where the number of ejection ports in the head is 40, it follows that the CPU reads data about 40 dots.

Then, the pattern width obtained from the pattern data is converted into an amount of ejection from the head 15 by referring to the conversion table stored in the ROM 2 described above. Therefore, if the pattern width is narrow, the amount of ejection (dot diameter) is reduced. If the pattern width is wide, the amount of ejection (dot diameter) is increased. In particular, this control over the amount of ejection is provided as follows. The pulse width of the ejection voltage in the form of a pulse applied to recording electrodes 15a (described later) within the head 15 from the driver 12 is controlled.

Subsequently, data for driving the head is corrected based on corrective data for controlling the amount of ejection stored in the ROM 2 and according to data from the temperature sensor 4. Corrected data for driving of the head is sent to the driver 12.

If an appropriate voltage is applied to the recording electrodes 15a of the head 15 from the driver 12, partitioning rib grains 16a made of a partitioning rib material such as lead. frit contained in a charged state in a solution 16 (described later) are ejected toward the glass plate 22 with a grain diameter proportional to the applied voltage or its pulse width owing to the electrostatic repulsive force.

The aforementioned laser displacement sensor 13 serves to detect the height of the head 15 above the glass plate 22. The CPU 1 provides feedback control to maintain the relative height constant. That is, in order to form the partitioning ribs 21 with accurate height, it is necessary that the relative distance between the glass plate 22 and the head 15 be constant. To provide control for this purpose, this laser displacement sensor 13 is mounted.

The relative distance between the glass plate 22 and the head 15 may be adjusted by moving the head 15 or by moving the glass plate 22.

In this example, feedback control is provided using the laser displacement sensor 13 to maintain constant the relative distance between the glass plate 22 and the head 15. It is to be noted that the invention is not limited to this scheme. For example, the relative distance may be kept constant simply by mechanical accuracy without performing measurement.

The aforementioned X position sensor 5 and the Y position sensor 6 are used to detect the relative positions of the glass plate 22 and the head 15 within a plane. For example, these sensors may be linear scales in the X and Y directions, respectively. Thus, the positional relation between the head 15 and the glass plate 22 within a plane is detected and feedback control is provided.

Especially high accuracy is required for the heights of the partitioning ribs 21 and so the laser displacement sensor 13 described above may also be used to measure the heights of the partitioning ribs themselves. In this case, the partitioning rib grains can be ejected under feedback control while reflecting the results of measurements made by the X and Y position sensors 5 and 6. Consequently, the cross-sectional shape of the partitioning ribs 21 can be maintained accurately.

Figure 2:
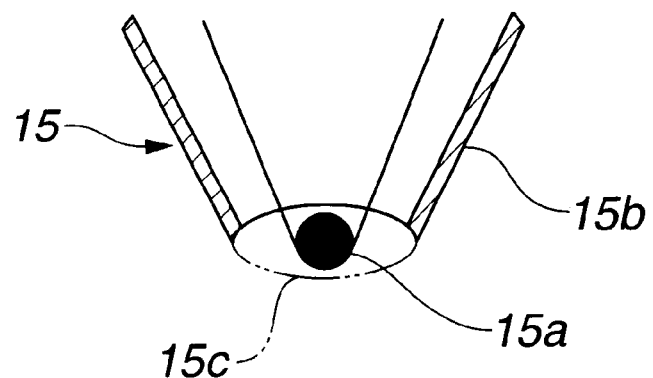
FIG. 2 is a side elevation partly in cross section showing the structure of heads of the embodiment described above.

FIG. 2 is a side elevation partly in cross section showing the structure of the head 15 described above.

This head 15 is made of a single nozzle member. A recording electrode 15a is disposed inside a tapering cover 15b. A circulating passage is formed between the cover 15b and the recording electrode 15a. Partitioning rib grains 16a (see FIG. 3) contained in the solution 16 are circulated through the circulating passage by the surface tension of the solution. A front-end portion of the cover 15b forms an ejection port 15c from which the partitioning rib grains 16a contained in the solution 16 are discharged. At the position of the ejection port 15c, the partitioning rib grains 16a in the solution 16 are agglomerated at a high density.

The material (partitioning rib material) for forming the partitioning ribs of the plasma display device is circulated through the circulating passage described above and prepared as follows.

Today's general partitioning rib material is lead frit. To cause the partitioning rib grains 16a consisting of the lead frit or the like to fly through the use of the head 15, the partitioning rib grains 16a are contained in a solvent (e.g., nonconductive carrier liquid such as water and ethyl alcohol) in a charged state.

The partitioning rib grains 16a contained in the solution 16 are ejected from the head 15 and then the solvent in the solution 16 is evaporated. In this way, the partitioning rib grains 16a are deposited, thus forming the partitioning ribs 21.

Where the solvent is water, for example, it may be considered that the partitioning rib grains 16a consisting of lead frit or the like settles into the solution 16, depending on the specific gravity of the partitioning rib grains 16a. Therefore, it is desired to provide a function of stirring the solution 16 at all times. For example, a stirring electrode for stirring the charged partitioning rib grains 16a within the solution 16 may be used.

Figure 3:
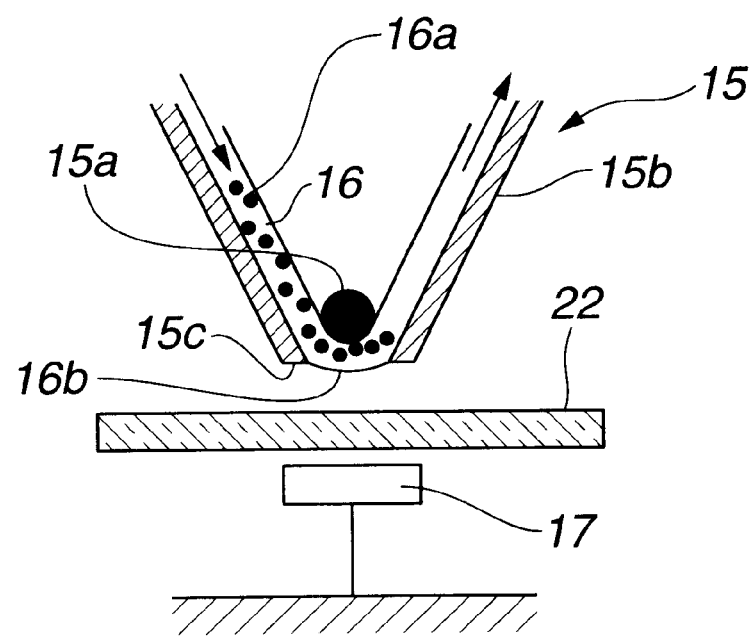
FIG. 3 is a side elevation in cross section of the embodiment described above, and in which no voltage is applied to recording electrodes.
Figure 4A:
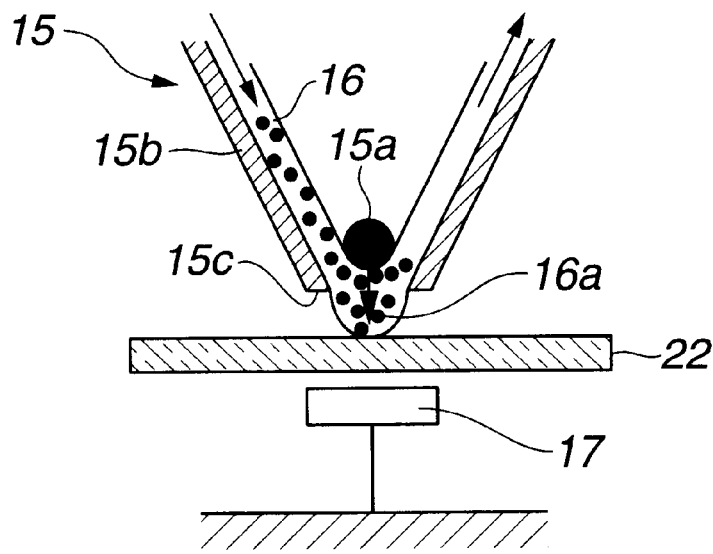
FIGS. 4A, 4B, and 4C are side elevations in cross section of the embodiment described above, in which partitioning rib grains are being ejected, and diagrams showing voltages applied to the recording electrodes.
Figure 4B:
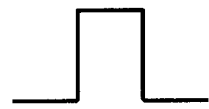
Figure 4C:
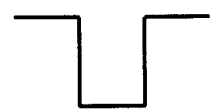
Figure 5:
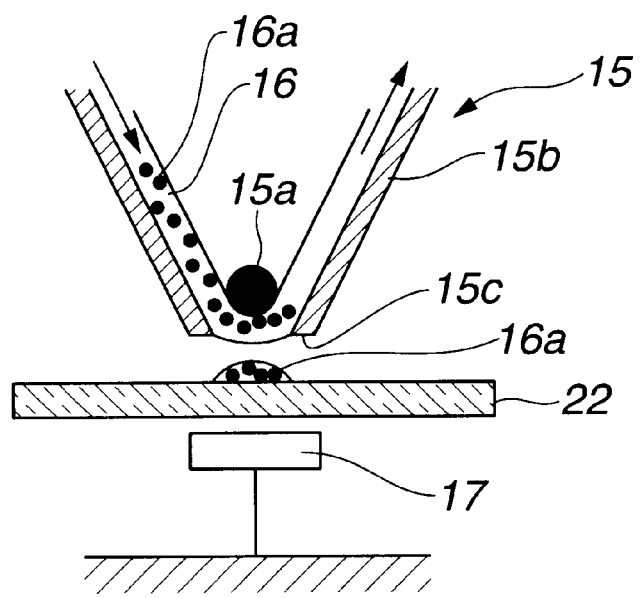
FIG. 5 is a side elevation in cross section of the embodiment described above, showing the manner in which ejected partitioning rib grains adhere to a glass plate or substrate.
Figure 6:
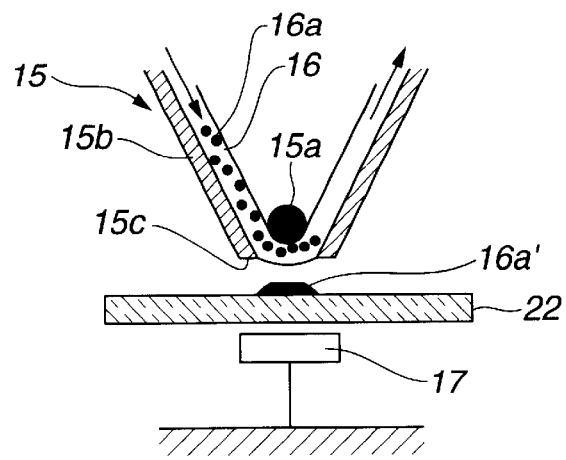
FIG. 6 is a side elevation in cross section of the embodiment described above, showing the manner in which the solvent of a solution adhering to the glass plate evaporates off, depositing only partitioning rib grains.

Deposition 16a' of the partitioning rib grains 16a is formed using the head 15 as described above in the manner shown in FIGS. 3–6. FIG. 3 is a side elevation in cross section showing the head when no voltage is applied to the recording electrode. FIGS. 4A, 4B, and 4C are respectively a side elevation in cross section showing the head when it is ejecting partitioning rib grains and diagrams illustrating the voltages applied to the recording electrode. FIG. 5 is a side elevation in cross section showing the manner in which ejected partitioning rib grains adhere to a glass plate. FIG. 6 is a side elevation in cross section showing the manner in which the solvent of the solution adhering to the glass plate evaporates and only the partitioning rib grains are deposited.

As shown in FIG. 3, a counter electrode 17 corresponding to the above-described recording electrode 15a is located on the opposite side of the glass plate 22 from the head 15. The aforementioned driver 12 applies ejection voltages in the form of pulses to these electrodes.

The solution 16 circulated through the circulating passage described above in the head 15 maintains a meniscus state 16b by surface tension as shown in FIG. 3.

If a positive pulse voltage as shown in FIG. 4B is applied to the recording electrode 15a via the driver 12 under control of the CPU 1 described above, a repulsive force acts on the partitioning rib grains 16a charged positively, i.e., at the same polarity as the recording electrode 15a as shown in FIG. 4A. When this repulsive force becomes greater than the surface tension of the solution 16, the grains are ejected by an electrostatic repulsion toward the glass plate 22 that is a substrate on which partitioning ribs should be formed. At this time, the partitioning rib grains 16a are sufficiently coagulated at the front end of the head 15 and so high-density partitioning rib grains 16a fly.

After the partitioning rib grains 16a ejected in this way leave the head 15, the grains are shaped into a substantially spherical form by the surface tension and made to fly. The size (spherical diameter) of the partitioning rib grains 16a can be adjusted by the width of the applied pulse voltage or other factor as mentioned above.

The force with which the partitioning rib grains 16a are ejected and the speed can be increased further by applying a negative pulse voltage as shown in FIG. 4C to the counter electrode 17 as shown in FIG. 17C, as well as by applying a positive pulse voltage to the recording electrode 15a as shown in FIG. 4B.

The partitioning rib grains 16a ejected in this manner adhere to the glass plate 22 while kept contained in the solution 16 as shown in FIG. 5.

Then, the solution 16 ejected onto the glass plate 22 is allowed to stand or heated and thus the solution disappears due to spontaneous evaporation or heated evaporation. Consequently, as shown in FIG. 6, only the partitioning rib material remains on the glass plate 22, thus forming deposition 16a as shown in FIG. 6.

The partitioning ribs 21 are formed by stacking the deposition 16a' in the manner described below.

Subsequently, a more practical structure of the head is next described.

Figure 7:
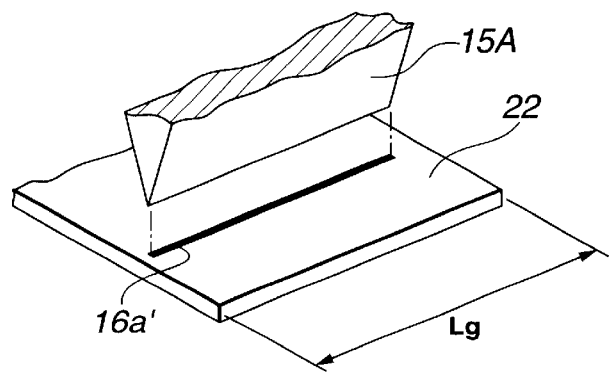
FIG. 7 is a perspective view of the embodiment described above, showing a head unit having a one-dimensional elongated ejection port.
Figure 8:
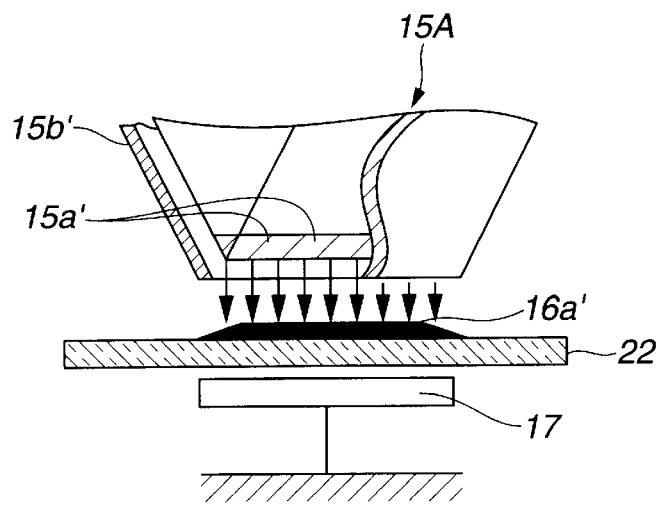
FIG. 8 is a perspective view partly in cross section of the embodiment described above, showing the internal structure of a head unit having a one-dimensional elongated ejection port.

FIG. 7 is a perspective view showing a head unit 15A having a one-dimensional elongated ejection port. FIG. 8 is a perspective view partly in cross section showing the internal structure of the head unit having the one-dimensional elongated ejection port.

This head unit 15A is fabricated as a single nozzle member having an ejection port for ejecting the partitioning rib grains 16a, the port being elongated along the one-dimensional direction. The length of the ejection port corresponds to the length corresponding to the length Lg of the glass plate 22.

The aforementioned head unit 15A uses an ejection mechanism making use of the electrostatic ejection technology as mentioned above. That is, as shown in FIG. 8, plural recording electrodes 15a' are arrayed along a straight line within a cover 15b' having a front end portion in the form of a substantially triangular prism. The positive pulse voltage as mentioned above is applied to these recording electrodes 15a'. If necessary, a negative pulse voltage is applied to the counter electrode 17. Thus, the partitioning rib grains 16a are ejected like a straight line toward the glass plate 22.

In the example described herein, an electrostatic ejection technique is used. An ink jet technology for generating air bubbles by instantaneous heating to eject a solution may also be employed.

At this time, ON/OFF of ejection, the amount of ejection, and the timing of the ejection are controlled by an electric circuit including the driver 12 as shown in FIG. 1 described above. Linear arrays of dots having arbitrary sizes and heights can be formed at arbitrary positions.

Because the head unit 15A having the straight ejection port as described above is used, straight deposition 16a' of uniform width as shown in FIG. 7 can be formed on the glass plate 22 simply by performing one ejection operation. Accordingly, partitioning ribs of uniform cross-sectional shape without nonuniform width can be accurately formed by stacking the deposition 16a'.

Figure 9:
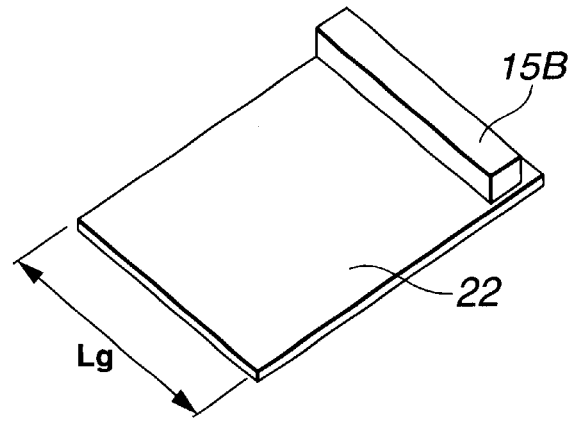
FIG. 9 is a perspective view of the embodiment described above, showing a multi-head subassembly placed on a glass plate or substrate.
Figure 10:
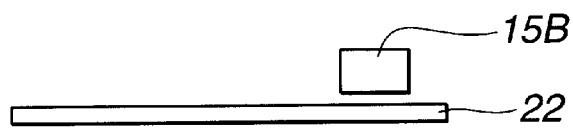
FIG. 10 is a side elevation of the embodiment described above, showing a multi-head subassembly placed on a glass plate.
Figure 11:
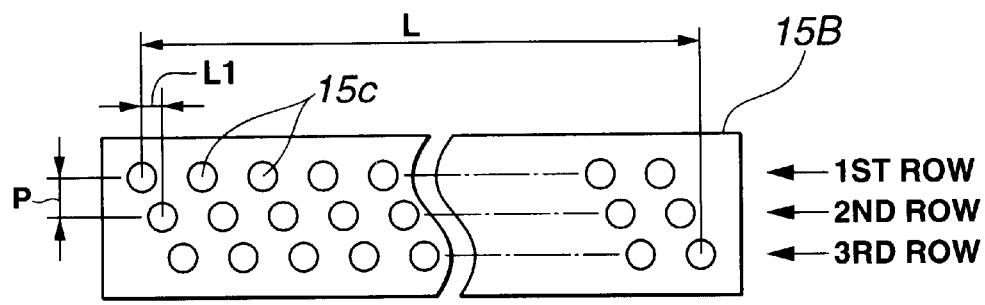
FIG. 11 is a bottom view showing the arrangement of ejection ports of the multi-head subassembly in accordance with the embodiment described above.
Figure 12A:
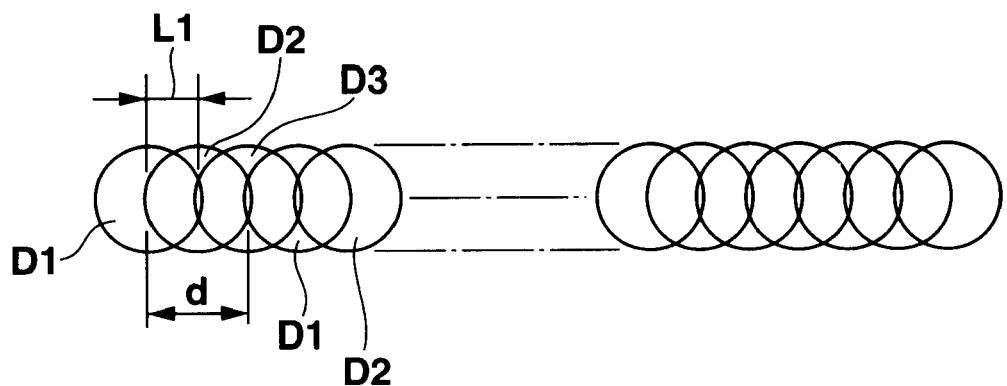
Figure 12B:
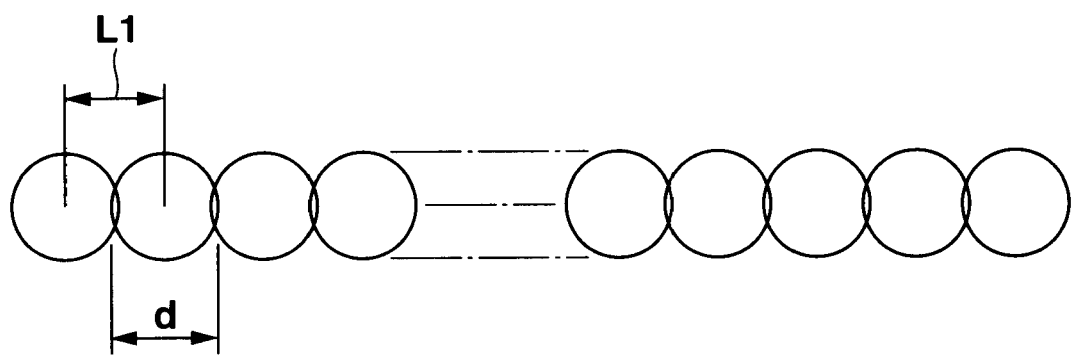

FIG. 9 is a perspective view showing a multi-head subassembly placed on a glass plate. FIG. 10 is a side elevation showing the multi-head subassembly placed on the glass plate. FIG. 11 is a bottom view showing the array of ejection ports in the multi-head subassembly. FIGS. 12A and 12B are views comparing dots formed by the multi-head subassembly with dots formed by the head used in the prior art printer or the like.

A multi-head subassembly 15B ejecting a material forming partitioning ribs is placed at a given distance from the glass plate 22 in a parallel relation to either the major sides or minor sides of the glass plate 22 that is rectangular, for example, as shown in FIGS. 9 and 10, it being noted that the partitioning ribs should be formed on the glass plate.

On the bottom surface of the multi-head subassembly 15B, n (n≧2) rows (three rows in the example shown in FIG. 11) of ejection ports 15c are formed in a zigzag manner. That is, three rows of straight arrays of nozzle members are arranged in a somewhat staggered relation to each other.

Specifically, the rows are arranged at spacing P. The ejection ports 15c of the adjacent rows are shifted by L1, which is 1/n of the spacing between the adjacent ejection ports 15c in the same row. Where there are three rows as mentioned above, the spacing between the adjacent ejection ports 15c in the same row is 3×L1.

The internal structure of the nozzle portion including the ejection ports 15c is the same as shown in FIG. 2 described above.

The maximum length L of the n rows of ejection ports 15c taken along the longitudinal direction of the multi-head subassembly 15B corresponds to the width Lg of the glass plate 22 on which partitioning ribs should be formed as shown in FIG. 9.

When the partitioning ribs 21 are formed using the multi-head subassembly 15B constructed in this way, a line for one row of partitioning ribs is formed on the glass plate 22 by the use of all the ejection ports 15c of the n rows (three rows in the example of FIG. 11).

That is, when partitioning rib grains 16a are ejected using the multi-head subassembly 15B described above, ejection is performed first by the use of the first row of ejection ports 15c to form dots D1 (see FIG. 12A). Then, the multi-head subassembly 15B is made to move a distance equal to the spacing P described above relative to the glass plate 22. Subsequently, ejection is performed, using the second row of ejection ports 15c to form dots D2 (see FIG. 12A). Thereafter, the multi-head subassembly is shifted by the spacing P. Ejection is performed using the third row of ejection ports 15c to form dots D3 (see FIG. 12A).

At this time, the movement of the position of the multi-head subassembly 15B is made accurate by providing feedback control by referring to the results of the three-dimensional detections from the X position sensor 5, Y position sensor 6, and the laser displacement sensor 13 as mentioned previously.

Furthermore, ON/OFF of the ejection from the ejection ports, the amount of ejection (=size and height of dots), and the timing of the ejection are electrically controlled by a configuration including the driver 12 as shown in FIG. 1. Dots having arbitrary size and height can be formed at arbitrary positions.

In this way, the spacing between the adjacent dots formed on the glass plate 22 is set to L1 such that L1<<d, where d is the size (diameter) of the dots formed on the glass substrate 22 as shown in FIG. 12A. That is, L1 is set sufficiently smaller than the diameter d. Accordingly, if all the ejection ports 15c eject the grains uniformly, plural dots are formed so as to be overlapped. Hence, one straight line of less nonuniform thickness is formed.

On the other hand, in the case of a head used in a normal image printer or the like as shown in FIG. 12B, relation L1≅d normally holds. If this head is used, adjacent dots do not overlap each other or slightly overlap each other. As a result, the formed straight line has nonuniform width.

Where the prior art head described thus far is used, various difficulties are highly likely to occur. For example, the shape is highly nonuniform. Sufficient accuracy is not obtained. Pin grooves are formed in the partitioning ribs.

Accordingly, dots as shown in FIG. 12A are formed using the multi-head subassembly 15B as shown in FIGS. 9–11, thus eliminating these difficulties. Highly accurate straight lines having uniform width can be formed. By stacking such straight lines, the partitioning ribs 21 having uniform cross-sectional shape and uniform width can be formed with high accuracy.

Dots are printed in an overlapped relation at the same position on the glass plate 22, using the head unit 15A or the multi-head subassembly 15B as described above. Thus, the partitioning ribs 21 are formed by stacking the material. The shape of the partitioning ribs 21 is next described by referring to FIGS. 13 and 14.

Figure 13:
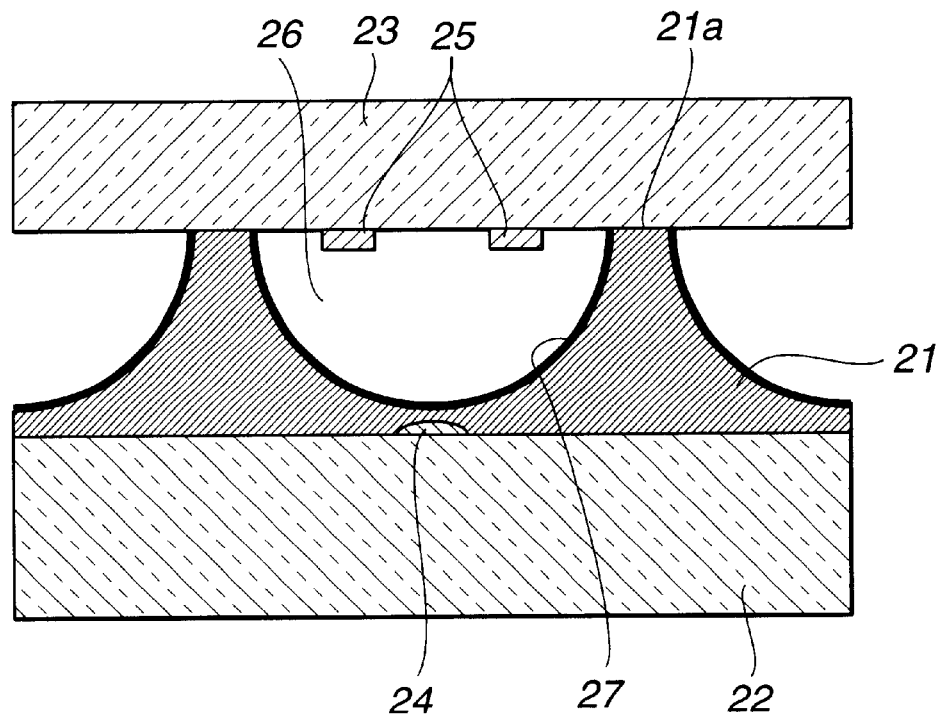
FIG. 13 is a cross-sectional view of the embodiment described above, showing a plasma display device having partitioning ribs of ideal shape.
Figure 14:
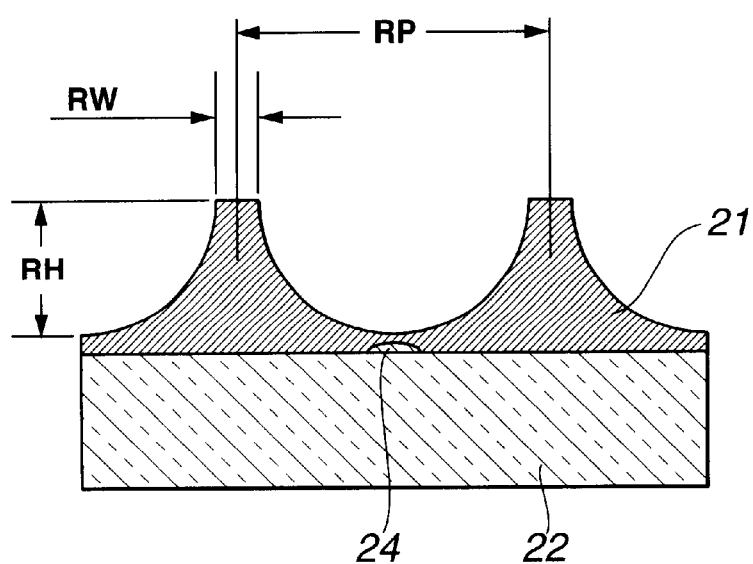
FIG. 14 is a cross-sectional view of the embodiment described above, showing partitioning ribs of ideal shape formed on a glass plate.

FIG. 13 is a cross-sectional view showing a plasma display device having partitioning ribs of ideal shape. FIG. 14 is a cross-sectional view showing partitioning ribs having an ideal shape and formed on a glass plate.

The plasma display device is fabricated by forming data electrodes 24 on a back-side glass plate 22 as shown in FIG. 13 and forming partitioning ribs 21 on the data electrodes. The partitioning ribs 21 are formed by stacking dots as mentioned previously.

Preferably, the shape of the partitioning ribs 21 satisfies the following conditions to accomplish higher accuracy. As shown in. FIG. 14, the pitch RP between individual ribs is more than 165 μm, for example. The total pitch tolerance is ±10 to 50 μm. The width RW at the front end 21a of each partitioning rib 21 is reduced to a minimum, preferably less than 20 μm. The height RH of each partitioning rib 21 is 120 to 150 μm. The variations of the heights of the partitioning ribs within a plane are ±5 μm. As can be seen by comparing these values, the heights of the partitioning ribs 21 are required to have the highest accuracy.

Phosphors 27 corresponding to emitted colors (R, G, B) are applied to the surfaces of the partitioning ribs 21 described above.

A front plate 23 is mounted to abut against the front ends 21a of the partitioning ribs 21. Transparent electrodes 25 are formed on the front plate 23. A rare gas is sealed in the gaps 26 between the partitioning ribs 21.

To enhance the reliability of the plasma display device of this construction, it is necessary that the density of the partitioning ribs 21 be high, the sealed rare gas do not leak, the phosphors do not exhibit leakage, have high intensity, and have stable electrical characteristics.

To prevent deterioration of the sealed-in rare gas for a long period, it is necessary to minimize the amount of carbon remaining in the partitioning ribs 21.

To enhance the hermeticity of the spaces in which the rare gas is sealed, it is necessary that the front end 21a of the partitioning ribs 21 be flat and have no nicks or cuts.

In this plasma display device, electrical discharge is produced between electrodes as mentioned above. The resulting ultraviolet radiation hits the phosphors 27 applied to the partitioning ribs 21. Visible light corresponding to the colors emitted by the phosphors 27 is emitted.

Means for stacking the dots as mentioned above to form the partitioning ribs 21 are described next in detail.

Figure 15:
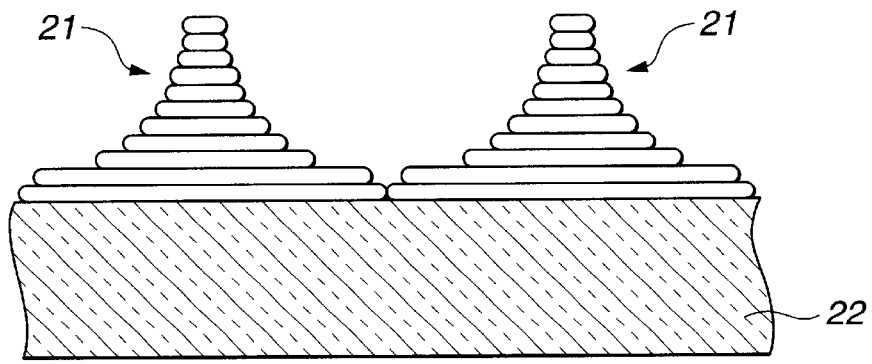
FIG. 15 is a view showing an example of the embodiment described above, and in which partitioning ribs are formed with varying diameters of dots.

FIG. 15 is a view illustrating an example of method of fabricating the partitioning ribs with varying dot diameter.

In this example, the width of the pulse voltage applied to the recording electrode is controlled so that the dot diameter varies vertically of the cross section of the partitioning ribs 21. More specifically, it is assumed that the dots forming the partitioning ribs 21 and located in this order from the lowest position have diameters of $\phi d1$, $\phi d2$, $\phi d3$, ..., $\phi dn$, respectively. The dots are so formed that their diameters satisfy relation $\phi d1 > \phi d2 > \phi d3 > ... > \phi dn$.

By varying the diameters of the dots in this way, partitioning ribs having arbitrary cross-sectional shape can be formed. Therefore, partitioning ribs of ideal shape can be obtained.

Figure 16:
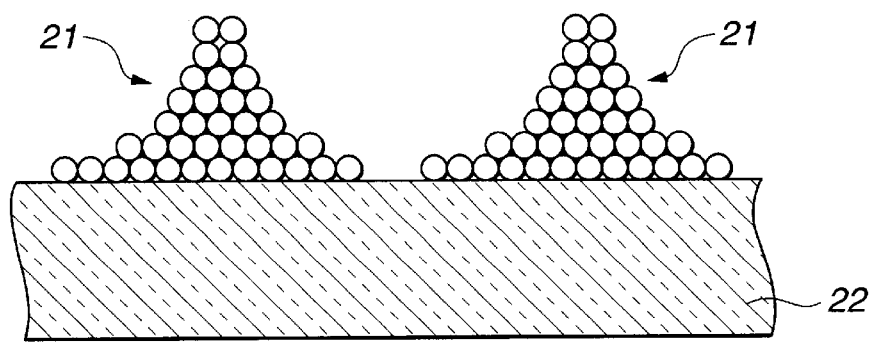
FIG. 16 is a view showing an example of the embodiment described above, and in which partitioning ribs are formed with varying numbers of dots.

FIG. 16 is a view showing an example of formation of partitioning ribs with varying numbers of dots.

In the direction of height of the partitioning ribs 21, the number of dots ejected is increased with going downward. The number of dots is reduced with going upward. The placement of these dots is controlled by controlling ON/OFF of the ejection ports from which the material is ejected and driving the motor 7 via the motor driver 8 while detecting the position of head by the X position sensor 5 and the Y position sensor 6.

Since partitioning ribs having an arbitrary shape can be formed at an arbitrary position, it is possible to make partitioning ribs of ideal shape.

Figure 17:
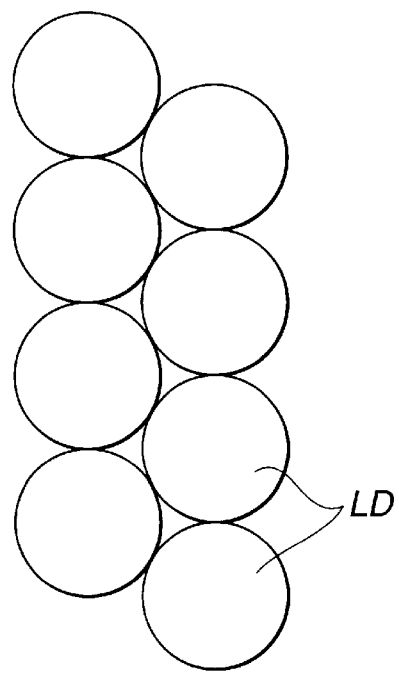
FIG. 17 is a plan view of the embodiment described above, showing the arrangement of partitioning rib grains for framework, the grains having large dot diameters.
Figure 18:
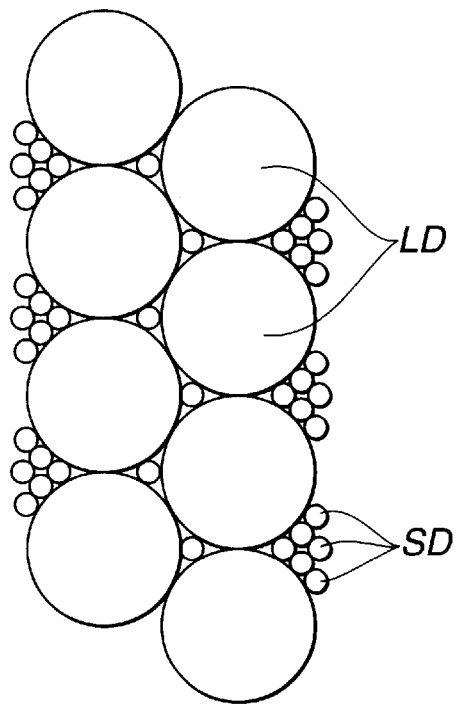
FIG. 18 is a plan view of the embodiment described above, showing a structure in which partitioning rib grains having small dot diameters are arranged between partitioning rib grains for framework.

FIG. 17 is a plan view showing the arrangement of partitioning rib grains used for framework and having large dot diameters. FIG. 18 is a plan view showing a configuration for arranging partitioning rib grains having small dot diameters in gaps between the partitioning rib grains for framework.

FIGS. 17 and 18 show a structure for making the partitioning ribs more robust than the construction as shown in FIG. 16, for example.

That is, partitioning rib grains LD having large grain diameters and used for framework are first ejected, the framework forming the partitioning ribs. Thus, a framework structure as shown in FIG. 17 is formed. Then, as shown in FIG. 18, partitioning rib grains SD having small diameters and located in the gaps are ejected to fill the gaps between the partitioning ribs formed by the partitioning rib grains LD for the framework. In consequence, robust partitioning ribs having higher density can be formed.

Figure 19A:
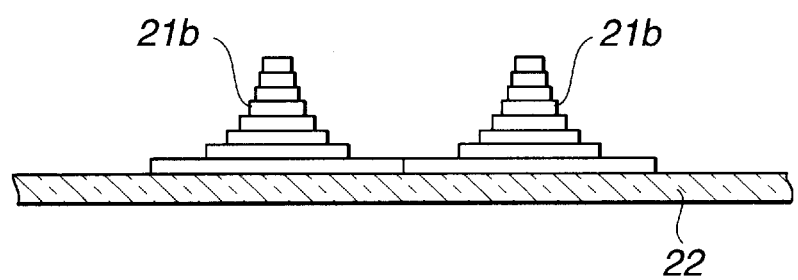
FIGS. 19A and 19B are views showing the manner in which a process step for applying phosphors is carried out simultaneously with a process step for forming partitioning ribs.
Figure 19B:
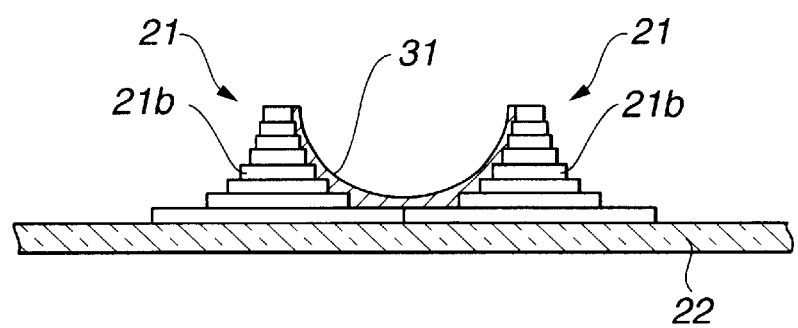

FIGS. 19A and 19B are views illustrating the manner in which a process step for applying phosphors is carried out simultaneously with a process step for forming partitioning ribs.

As shown in FIG. 19A, a partitioning rib base 21b is made of partitioning rib grains LD for framework on a glass plate 22. Under this condition, partitioning rib grains SD which are used for gaps and contain phosphor materials are ejected, thus filling the gaps between the partitioning grains LD for the framework. Hence, the surface is smoothed. Partitioning ribs 21 whose surface is applied with the phosphors 31 can be obtained, as shown in FIG. 19B.

Use of the means described above makes it unnecessary to perform the separate process step of applying phosphors. This process step would normally be necessary where a plasma display device is formed. Consequently, accurate plasma display devices can be fabricated with a higher throughput.

Figure 20A:
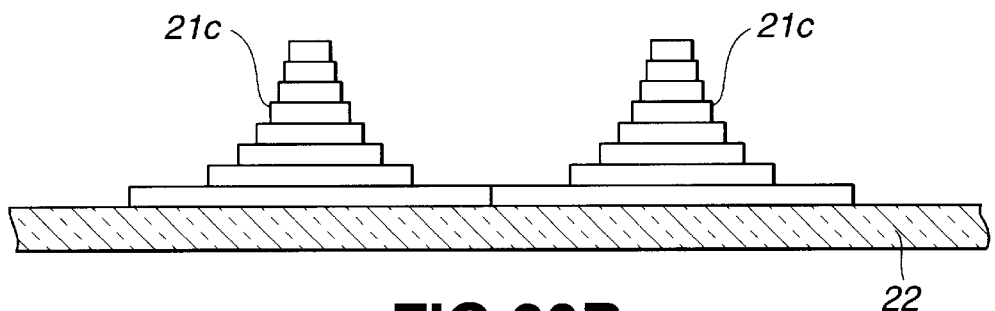
FIGS. 20A and 20B are views showing process steps of the embodiment described above, and in which partitioning ribs are formed using a UV curable material.
Figure 20B:
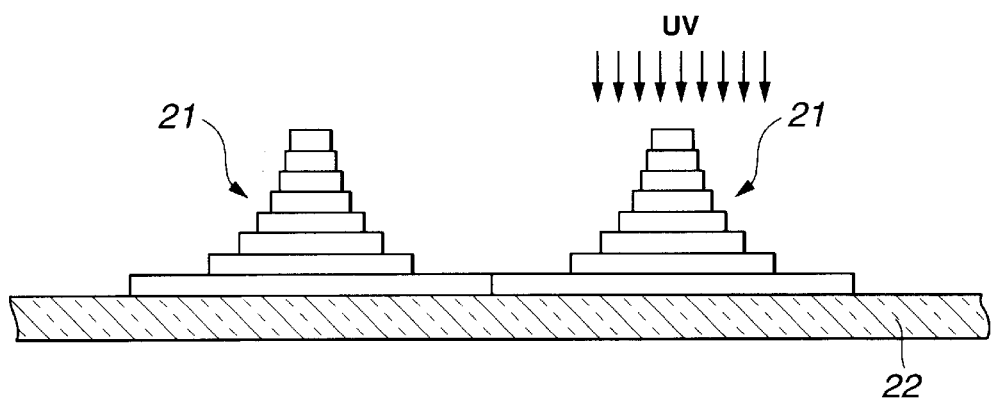

FIGS. 20A and 20B are views illustrating process steps of forming partitioning ribs, using an UV curable material.

A partitioning rib base 21c shown in FIG. 20A is made of a partitioning rib grain material consisting of a binder impregnated with a UV curable material such as acrylics, epoxies, and polyenethiols.

After forming a shape as shown in FIG. 20A by the ejection, ultraviolet radiation is illuminated to cause curing as shown in FIG. 20B, thus forming partitioning ribs 21.

Use of this means makes it possible to cure the curable material by UV irradiation without the need to wait for evaporation of the solvent.

FIGS. 21A, 21B, 21C, and 21D are views illustrating process steps for forming partitioning ribs using a resist material.

Figure 21A:
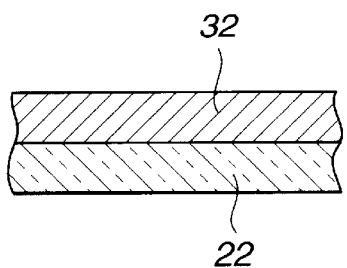
FIGS. 21A, 21B, 21C, and 21D are views illustrating process steps of the above-described embodiment for forming partitioning ribs using a resist material.

First, a UV curable material 32 for forming partitioning ribs is applied uniformly such that the thickness is equal to the height of the partitioning ribs to be formed on a glass plate 22, as shown in FIG. 21A.

Figure 21B:
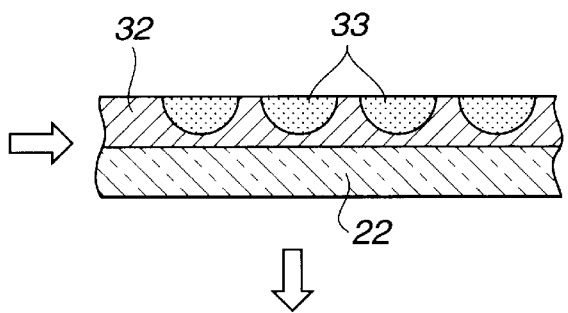

Then, a resist material 33 made of a component different from the partitioning rib-forming material 32 is ejected from the head to form a grooved structure on the already applied partitioning rib-forming material 33, as shown in FIG. 21B.

Figure 21D:
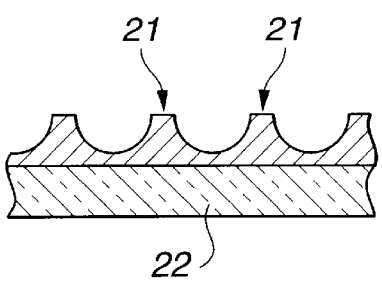
Figure 21C:
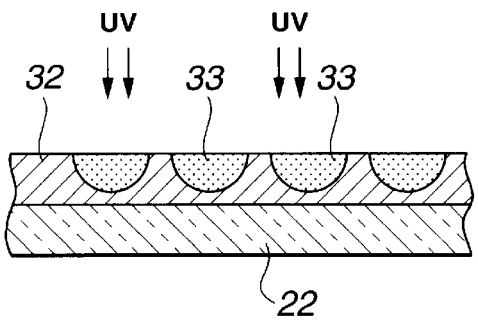

Under this condition, ultraviolet radiation is illuminated as shown in FIG. 21C to cure the portion of the partitioning rib-forming material 32 excluding the portion from which the resist material 33 was ejected on the glass plate 22.

Then, the resist material 33 is removed by hydraulic pressure, vibration, heating and evaporation, or other method, thus leaving only the partitioning ribs 21 on the glass plate 22 as shown in FIG. 21D.

Use of this means permits formation of partitioning ribs of ideal shape, because partitioning ribs having an arbitrary cross-sectional shape can be formed. Furthermore, the partitioning ribs can be made uniform in height at high accuracy, because the previously uniformly applied surface becomes the top surfaces of the partitioning ribs. In addition, the shapes of the top end surfaces of the partitioning ribs can be flattened with high accuracy.

Figure 22A:
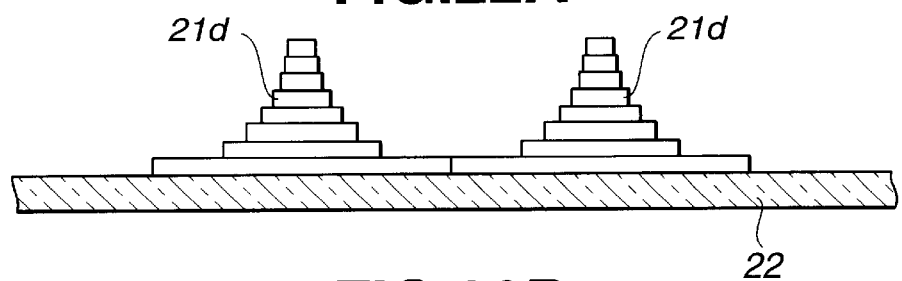
FIGS. 22A, 22B, and 22C are views illustrating process steps for forming partitioning ribs of high strength using a two-part curing material.
Figure 22B:
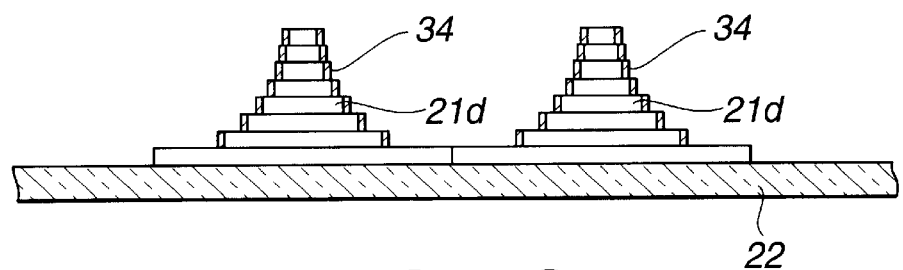
Figure 22C:
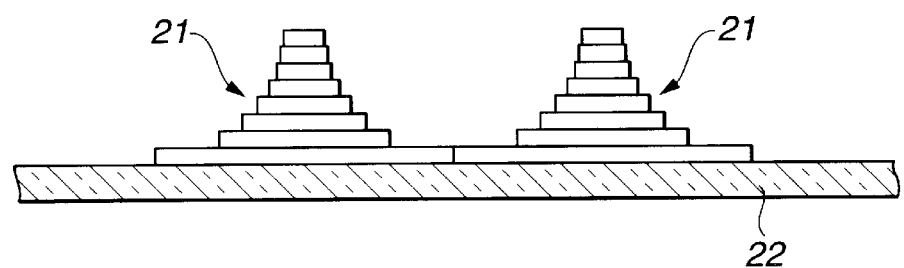

FIGS. 22A, 22B, and 22C are views illustrating process steps of forming partitioning ribs of high strength, using a two-part curing material.

As shown in FIG. 22A, a partitioning rib-forming material to which the main ingredient of a two-part curing material consisting of an epoxy-based material has been added is ejected from the head to form a partitioning rib base 21d.

Then, as shown in FIG. 22B, a curing agent 34 is applied to the partitioning rib base 21d to which the main ingredient has been added, to finish the shape of the surface of the partitioning rib base 21d and to cure the partitioning rib base 21d.

At this time, the application of the curing agent 34 may be performed by ejecting the curing agent, using a head separate from the head that ejects the main ingredient. Alternatively, the application operation may be carried out, using a general dispenser.

In this way, final partitioning ribs 21 having a desired shape and high strength as shown in FIG. 22C can be obtained.

Where the binder is adjusted and a low-viscosity partitioning rib-forming material is selected as the main ingredient, if desired accuracy or shape is not achieved after formation of the partitioning rib base, only that portion can be corrected later. It may be cured later with a curing agent. Use of this means can enhance the yield.

Figure 23A:
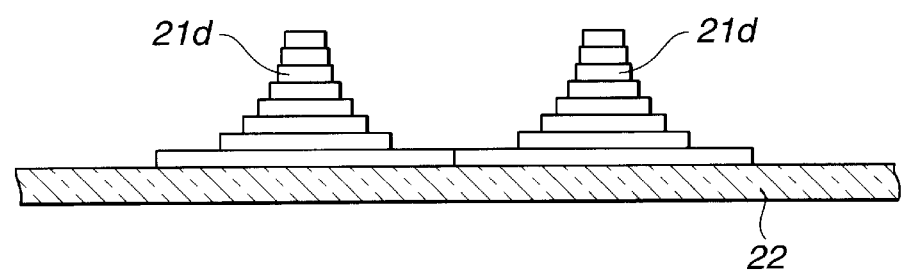
FIGS. 23A and 23B are views illustrating process steps for forming partitioning ribs of high strength using a curing agent impregnated with phosphor materials.
Figure 23B:
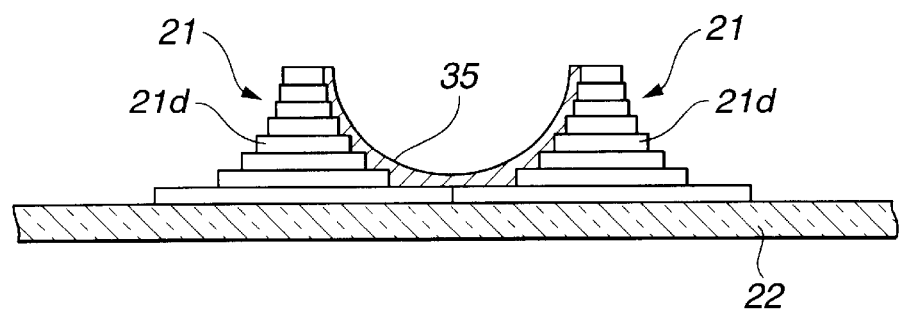

FIGS. 23A and 23B are views illustrating process steps of forming partitioning ribs of high strength, using a curing agent impregnated with phosphor materials.

When a partitioning rib base 21d formed from a partitioning rib-forming material to which the main ingredient of a two-part curing material is added is cured as shown in FIG. 23A, a curing agent 35 impregnated with phosphor materials is applied as shown in FIG. 23B. At the same time, the surface is smoothed.

At this time, the head that ejects the phosphor materials acting also as a curing agent may be integrated with a head that ejects the main ingredient forming the partitioning rib base 21d. Alternatively, they may be formed separately and driven independently. That is, separate structures may be used.

Thus, the process step for curing the partitioning rib base and the process step for applying the phosphors can be effected simultaneously. This can greatly simplify the working process for fabricating a plasma display device. This can improve the productivity.

Figure 24:
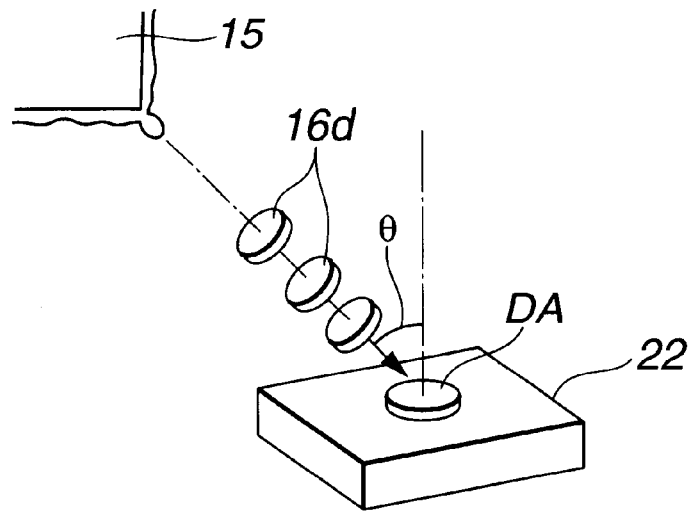
FIG. 24 is a perspective view of the embodiment described above, showing the manner in which a head is tilted to form substantially elliptical dots on a glass plate.
Figure 25:
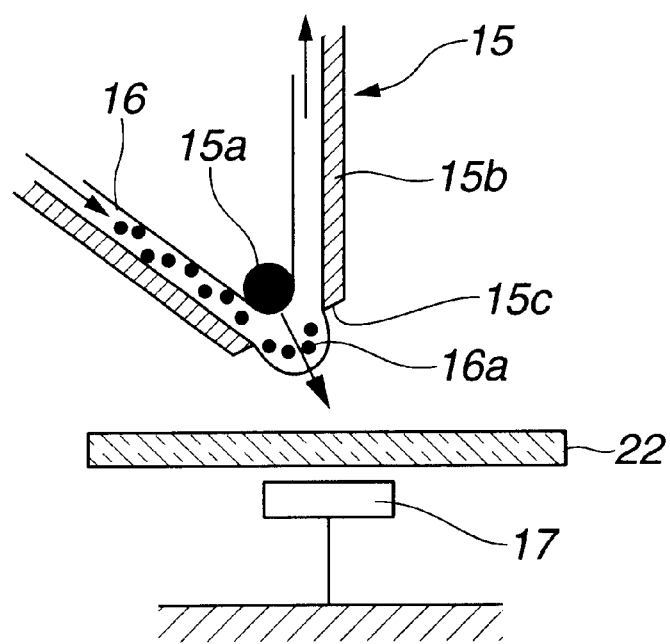
FIG. 25 is a side elevation in cross section of the embodiment described above, showing the manner in which a tilted head is ejecting partitioning rib grains.
Figure 26:
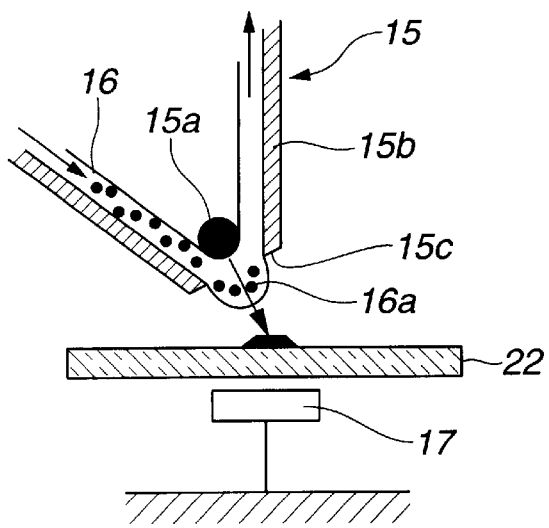
FIG. 26 is a side elevation in cross section of the embodiment described above, showing the manner in which partitioning grains ejected obliquely adheres to a glass plate.

FIG. 24 is a perspective view illustrating the manner in which a head is tilted to form substantially elliptical dots on a glass plate or substrate. FIG. 25 is a side elevation partially in cross section showing the manner in which partitioning rib grains are ejected from the tilted head. FIG. 26 is a side elevation in cross section showing the manner in which the partitioning rib grains ejected obliquely adheres to the glass plate.

These FIGS. 24, 25, and 26 show a structure for forming substantially elliptical dots on a glass plate 22, using the aforementioned head 15, for example, that ejects normal spherical partitioning rib grains.

That is, the head 15 is tilted at an appropriate angle of $\theta$ as shown from the normal to the face of the glass plate 22.

Thus, if a pulse voltage is applied to the recording electrode 15a, partitioning rib grains 16d ejected toward the glass plate 22 from the head 15 hit the surface of the glass plate 22 while drawing an oblique trajectory. They adhere to the glass plate 22 as shown in FIG. 26. As a result, substantially elliptical dots DA are formed as shown in FIG. 24.

The partitioning rib grains 16d that were ejected from the head 15 and are flying are shown to assume a disklike form in FIG. 24 to facilitate understanding that the partitioning rib grains 16d form substantially elliptical dots DA after adhering to the glass plate 22. In practice, they assume substantially spherical form due to surface tension as mentioned previously.

By using dots other than circular form in this way, the width of the formed line can be controlled. Furthermore, straight lines of less unevenness can be formed.

Figure 27:
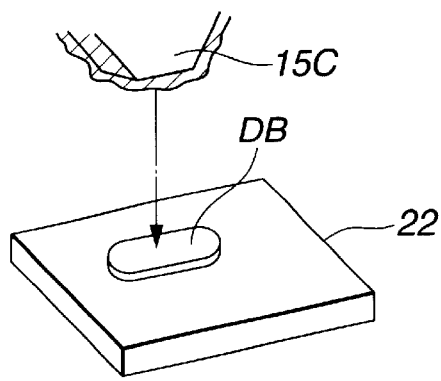
FIG. 27 is a perspective view of the embodiment described above, showing a head for forming substantially elliptical dots.

FIG. 27 is a perspective view showing a head for forming substantially elliptical dots.

This head, 15C, has a front-end portion that is fabricated as a single nozzle member that is a plane stacked structure as shown in FIG. 8. The head has a slightly elongated ejection port.

If the head 15C of this structure is used, substantially elliptical dots DB can be formed on a glass plate 22 while maintaining a vertical posture if the head itself is not tilted.

Figure 28:
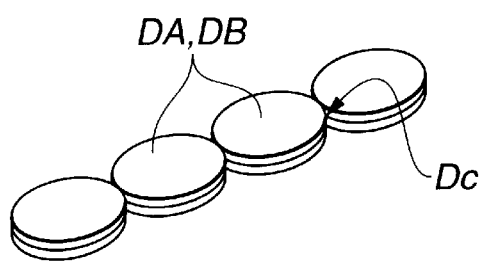
FIG. 28 is a perspective view of the embodiment described above, showing the manner in which substantially elliptical dots are stacked at the same position.
Figure 29A:
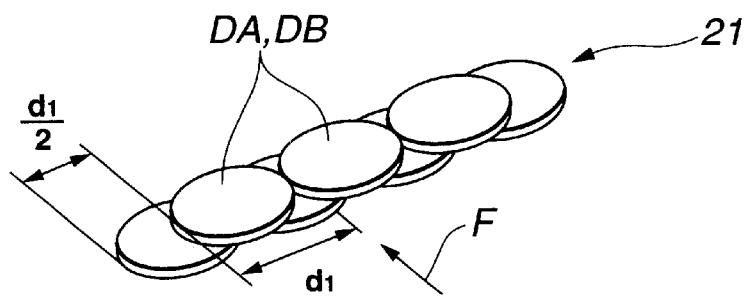
FIGS. 29A and 29B are perspective view of the embodiment described above, showing the manner in which substantially elliptical dots are stacked in a staggered fashion.
Figure 29B:
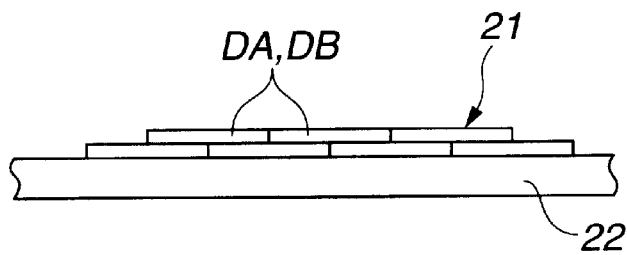

FIG. 28 is a perspective view showing the manner in which substantially elliptical dots are stacked at the same location. FIGS. 29A and 29B are perspective views showing the manner in which substantially elliptical dots are stacked in a staggered manner.

Where partitioning ribs are formed using substantially elliptical dots DA and DB as mentioned above, if the dots DA and DB are simply aligned at the same position and stacked, then a state as shown in FIG. 28 is obtained. That is, the joint Dc of the adjacent dots DA and DB forms a concave portion, which forms a neck. This may deteriorate the density and robustness of the partitioning ribs.

Accordingly, as shown in FIG. 29A and in FIG. 29B that is a side elevation taken from the direction of the arrow F of FIG. 29A, dots DA and DB that are at two or more levels are stacked such that their joints are staggered.

In particular, let d1 be the diameter of the dots DA and DB taken in the direction of the array of the dots. They are shifted by d1/2 vertically and stacked. This can further enhance the robustness of the partitioning ribs.

Figure 30A:
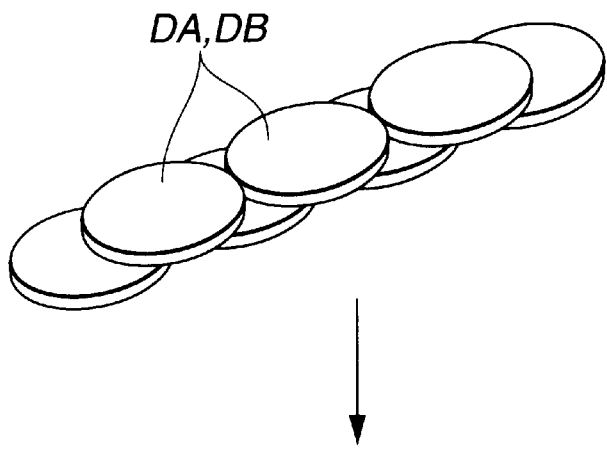
FIGS. 30A and 30B are perspective views of the embodiment described above, showing the manner in which substantially elliptical dots are melted together.
Figure 30B:
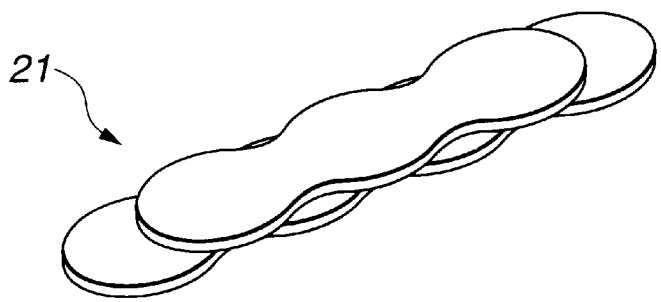

FIGS. 30A and 30B are perspective views showing the manner in which substantially elliptical dots stacked in a staggered manner are melted together.

The dots DA and DB (see FIG. 30A) are stacked at different levels and staggered as shown in FIGS. 29A and 29B. Then, the dots are heat-treated or otherwise processed as shown in FIG. 30B to melt the edges of the dots. Hence, the gaps between the dots can be filled up tightly. Partitioning ribs 21 having greater robustness and free of gaps can be formed.

FIGS. 31A and 31B are views showing the manner in which a head is vibrated minutely to shape the partitioning ribs.

In this example, a head 15 that ejects partitioning ribs of a given diameter is vibrated about a centerline M shown in FIG. 31A with a relative amplitude corresponding to the height of partitioning ribs 21 as shown in FIG. 31B, thus forming partitioning ribs.

That is, the width shape corresponding to the height of the partitioning ribs 21 is so set that the bottom side portion as shown in FIG. 31A is wide and that the top portion is narrow. For this purpose, as shown in FIG. 31B, where lower portions of the partitioning ribs 21 are formed, they are vibrated at a large amplitude (e.g., at a low frequency). As the height of the partitioning ribs 21 increases, the amplitude is reduced gradually. Where the top portions of the partitioning ribs 21 are formed, the amplitude is minimized, and the ribs are vibrated at the highest frequency, for example. In this way, the ribs are shaped.

It is only necessary that the head 15 and the glass plate 22 vibrate relative to each other. Therefore, the head 15 may be vibrated, or the glass plate 22 may be vibrated. Alternatively, both may be vibrated.

Furthermore, partitioning ribs of an arbitrary cross-sectional shape can be formed by varying the amplitude or the frequency of vibration with time at will in forming the partitioning ribs.

Use of this means makes it possible to fabricate partitioning ribs of an arbitrary cross-sectional shape without relying on the spacing between the ejection ports in the head 15 or on their arrangement. Consequently, an ideal shape can be imparted to the partitioning ribs.

FIGS. 32A and 32B are views illustrating the manner in which the surfaces of partitioning ribs are smoothed, using a finishing material having no affinity with the partitioning rib-forming material.

One example of the means for improving the degree of smoothness of the surfaces of the partitioning ribs formed as mentioned above is described by referring to FIGS. 32A and 32B.

The partitioning rib base 21b formed by stacking of dots have surfaces that are not always smooth as shown in FIG. 32A. Accordingly, a different material 38 (referred to as a finishing material) having no affinity with the partitioning rib-forming material forming the partitioning rib base 21b is sprayed against the partitioning rib base 21b. The surface of the partitioning rib base 21b is erased by the action obtained by collision of the finishing material 38, thus providing smoothing. As a result, as shown in FIG. 32B, partitioning ribs 21 having an improved degree of smoothness are formed.

As mentioned previously, a material having no affinity with the partitioning rib-forming material is selected as the finishing material 38 and so the finishing material does not stick to the surface of the partitioning rib base 21b. If the material is allowed to stand, the material will peel off spontaneously. The finishing material may be removed more reliably by washing the material in a later process step.

The head for spraying the finishing material 38 may be made different from the head for ejecting the partitioning rib-forming material. Alternatively, the same head may be used, and the path for supplying the sprayed material to the head may be switched.

Where curing processing as shown in FIGS. 22A, 22B, and 22C is performed, if smoothing is carried out before the curing, the surface can be smoothed more easily. If smoothing is done after curing, the surface can be smoothed more minutely. Therefore, smoothing processing steps performed before and after, respectively, may be effected separately according to the need.

FIGS. 33A and 33B are views illustrating the manner in which the surface of partitioning ribs is smoothed, using a finishing material having an affinity with the partitioning rib-forming material.

In the example indicated by 32 as described above, a finishing material having no affinity with the partitioning rib-forming material is used. On the other hand, in the example shown in FIGS. 33A and 33B, a finishing material having an affinity is used.

That is, a different material 39 (referred to as a finishing material) having an affinity with the partitioning rib-forming material is sprayed against the surface of the partitioning rib base 21b formed by stacking of dots as shown in FIG. 33A. Thus, as shown in FIG. 33B, the step across the partitioning rib base 21b is buried and eliminated to enhance the degree of smoothness of the partitioning ribs 21.

The head for spraying the finishing material may be separate from the head for applying the partitioning rib-forming material or they may be the same, in the same way as the foregoing.

Similarly, the finishing material may be sprayed either before or after the curing processing shown in FIGS. 22A, 22B, and 22C.

FIG. 34 is a plan view showing the arrangement of a glass plate and a head for forming grid-like partitioning ribs.

On the AC plasma display device, partitioning ribs are formed like stripes. On the other hand, on the DC plasma display device, partitioning ribs are formed like a grid or cells. Accordingly, the example shown in FIG. 34 is a structure for forming grid-like partitioning ribs.

On a rectangular glass plate or substrate 22, a head 15X for x-direction is positioned in the x-direction. A head 15Y for y-direction is positioned in the y-direction. These heads 15X and 15Y are mounted to be movable on the glass plate 22 in mutually orthogonal directions.

In this structure, where partitioning ribs are formed, the x-direction head 15X is first moved in the x direction to form partitioning ribs for the x-direction. Then, the y-direction head 15Y is moved to form partitioning ribs for the y-direction. Thus, grid-like partitioning ribs are formed.

This structure facilitates forming grid-like partitioning ribs. With the structure shown in FIG. 34, partitioning ribs like stripes can be fabricated without modifying the structure at all by using a head only for x or y direction. In this way, the device has high generality.

FIGS. 35A, 35B, and 35C are a side elevation and plan views, respectively, showing other example of structure of equipment for forming grid-like partitioning ribs of a plasma display device.

This equipment for fabricating partitioning ribs of the plasma display device is equipped with one head 15Z capable of forming linear dots as shown in FIG. 35A. This head 15Z has a length that can correspond to the major sides of the rectangular glass plate 22. This head 15Z can be driven in a direction perpendicular to the formed linear dots by the motor 7 described above. Of course, the vertical position is controlled by feedback technology by referring to the results of detections made by the aforementioned X position sensor 5 and Y position sensor 6.

The aforementioned glass plate 22 is fixed to a table 41. This table 41 is held so as to be rotatable about a rotating shaft 41a. This rotating shaft 41a is rotated by a driving force from an electric motor (not shown) or the like.

In this structure, when partitioning ribs are formed, partitioning ribs 21 are formed like stripes parallel to one side of the glass plate 22 as shown in FIG. 35B. Then, as shown in FIG. 35C, the table 41 is rotated through 90 degrees, and partitioning ribs 21 are formed like stripes parallel to other side of the glass plate 22. In this way, grid-like partitioning ribs are formed.

Also, in the structure shown in FIGS. 35A, 35B, and 35C, only stripe-like partitioning ribs can be formed in the same way as the foregoing.

FIGS. 36A and 36B are views illustrating the manner in which the pitch between adjacent partitioning ribs is made variable by tilting the head toward the direction in which the head is scanned.

In the head shown in FIGS. 36A and 36B, plural head units are arrayed at given intervals. Each of the head units consists of a nozzle member as shown in FIG. 3 and other figures described above. The aforementioned head forms partitioning ribs in the same direction as the direction of array of nozzle members. On the other hand, in the head shown in FIGS. 36A and 36B, dots are printed in succession in a direction perpendicular to the direction of array of the nozzle members, thus forming partitioning ribs.

That is, this example of head has plural nozzle members arranged in line at intervals of DP0. The direction of array of the nozzle direction relative to the direction of scan can be varied by rotation.

If dots D are printed to form-partitioning ribs while making a scan in a direction perpendicular to the direction of array of the nozzle members, using the head described above, the partitioning ribs spaced from each other by pitch DP0 as shown in FIG. 36B are formed in the direction of scan of the head.

If the head is rotated relative to the direction of scan, partitioning ribs are formed along the direction of scan at a pitch DP1 narrower than the aforementioned pitch DP0, as shown in FIG. 36A.

This pitch DP1 can be adjusted at will by the angular position of the head. Therefore, partitioning ribs in the form of stripes can be formed at an arbitrary pitch. In this way, if partitioning ribs are formed at varying pitch, the equipment can cope with the situation without preparing additional equipment.

In this embodiment, partitioning rib grains are ejected from the nozzle member of the head, thus forming partitioning ribs. Therefore, partitioning ribs having accurate shape and dimensions can be fabricated with relatively small-sized equipment in a short processing time.

Moreover, partitioning ribs of various dimensions and shapes can be manufactured without greatly modifying the production equipment. Phosphors can be applied by the same process step as the step of fabricating partitioning ribs. Hence, the productivity can be enhanced further.

In this invention, it is apparent that working modes different in a wide range can be formed on the basis of this invention without departing from the spirit and scope of the invention. This invention is not restricted by any specific embodiment except being limited by the appended claims.

What is claimed is:

1. Equipment for fabricating partitioning ribs of a plasma display device, said equipment comprising:
   a head having a nozzle member for ejecting partitioning rib grains to form said partitioning ribs, wherein said nozzle member has plural recording electrodes arranged in a direction perpendicular to a direction in which the partitioning rib grains are ejected; and
   a controller for controlling an ejection voltage applied to the recording electrodes such that said nozzle member ejects partitioning rib grains having different aspect ratios.

2. Equipment for fabricating partitioning ribs of a plasma display device as set forth in claim 1, wherein said nozzle member is adapted to eject substantially spherical partitioning rib grains when an ejection voltage is applied, the equipment further comprising:
   means for controlling spherical diameters of said spherical partitioning rib grains.

3. Equipment for fabricating partitioning ribs of a plasma display device as set forth in claim 1, further comprising:
   means for positioning the nozzle member on an X-Y plane,
   wherein the nozzle member is tilted with respect to the X-Y plane such that partitioning rib grains ejected from said nozzle member follow a trajectory in a direction crossing a normal to the X-Y plane such that the ejected partitioning rib grains will adhere to a substrate while assuming a substantially elliptical form.

4. Equipment for fabricating partitioning ribs of a plasma display device as set forth in claim 1, further comprising:
   first partitioning rib grains including a first partitioning rib material; and
   second partitioning rib grains including a second partitioning rib material,
   wherein the second partitioning rib material has no affinity with said first partitioning rib material such that when the second partitioning rib grains are ejected from said nozzle member, convex portions on said first partitioning ribs are erased, thereby finishing their surface shape.

5. Equipment for fabricating partitioning ribs of a plasma display device as set forth in claim 1, further comprising:
   first partitioning rib grains including a first partitioning rib material; and
   second partitioning rib grains including a second partitioning rib material,
   wherein the second partitioning rib material has an affinity with said first partitioning rib material such that when the second partitioning rib grains are ejected from said nozzle member, concave portions in said first partitioning ribs are filled, thereby finishing their surface shape.

6. Equipment for fabricating partitioning ribs of a plasma display device as set forth in claim 1, further comprising:
   first partitioning rib grains including a first partitioning rib material; and
   second partitioning rib grains including a curing agent,
   wherein when the second partitioning rib grains are ejected from said nozzle member, first partitioning ribs are cured.

7. Equipment for fabricating partitioning ribs of a plasma display device as set forth in claim 1, wherein the partitioning rib grains for forming said partitioning ribs include an UV curable material.

8. Equipment for fabricating partitioning ribs of a plasma display device as set forth in claim 1, further comprising means for reciprocating said nozzle member, as it ejects said partitioning rib grains, based on a width of said partitioning ribs so as to be parallel to a main face of a substrate on which the partitioning ribs are to be formed.

9. Equipment for fabricating partitioning ribs of a plasma display device as set forth in claim 1, wherein said head has plural nozzle members arrayed, and wherein said head is designed to vary its angular position relative to said substrate within a plane parallel to a main face of the substrate on which the partitioning ribs should be formed.

10. Equipment for fabricating partitioning ribs of a plasma display device as set forth in claim 1, further comprising a head distance control means for controlling position of at least one of said head and a substrate on which the partitioning ribs should be formed to maintain constant relative distance between said head and said substrate when the partitioning ribs are formed.

11. Equipment for fabricating partitioning ribs of a plasma display device as set forth in claim 1, further comprising an ejection amount control means for controlling the amount of partitioning rib grains ejected from said nozzle member to make uniform formed partitioning ribs in height.

12. A method for fabricating partitioning ribs of a plasma display device, said method comprising:
   ejecting partitioning rib grains from a nozzle member to form said partitioning ribs, wherein the nozzle member has plural recording electrodes arranged in a direction perpendicular to a direction in which the partitioning rib grains are ejected; and
   controlling an ejection voltage applied to the recording electrodes such that the nozzle ejects partitioning rib grains having different aspect ratios.

13. A method for fabricating partitioning ribs of a plasma display device, said method comprising:

ejecting partitioning rib grains from a nozzle member to form said partitioning ribs, wherein the nozzle member has plural recording electrodes arranged in a direction perpendicular to a direction in which the partitioning rib grains are ejected; and controlling an ejection voltage applied to the recording electrodes, as the nozzle ejects spherical partitioning rib grains, to control spherical diameters of said spherical partitioning rib grains.

14. A method for fabricating partitioning ribs of a plasma display device, said method comprising:

positioning the nozzle member on an X-Y plane; and ejecting partitioning rib grains from a nozzle member to form said partitioning ribs, wherein the nozzle member has plural recording electrodes arranged in a direction perpendicular to a direction in which the partitioning rib grains are ejected, wherein the nozzle member is tilted with respect to the X-Y plane such that partitioning rib grains ejected from said nozzle member follow a trajectory in a direction crossing a normal to the X-Y plane such that the ejected partitioning rib grains will adhere to a substrate while assuming a substantially elliptical form.

15. A method for fabricating partitioning ribs of a plasma display device, said method comprising:

ejecting first partitioning rib grains including a first partitioning rib material from a nozzle member to partially form said partitioning ribs, wherein the nozzle member has plural recording electrodes arranged in a direction perpendicular to a direction in which the partitioning rib grains are ejected; and ejecting second partitioning rib grains including a second partitioning rib material from the nozzle member, wherein the second partitioning rib material has no affinity with said first partitioning rib material such that the second partitioning rib grains erase convex portions on said the partially formed partitioning ribs to further form the partitioning ribs.

16. A method for fabricating partitioning ribs of a plasma display device, said method comprising:

ejecting first partitioning rib grains including a first partitioning rib material from a nozzle member to partially form said partitioning ribs, wherein the nozzle member has plural recording electrodes arranged in a direction perpendicular to a direction in which the partitioning rib grains are ejected; and ejecting second partitioning rib grains including a second partitioning rib material from the nozzle member, wherein the second partitioning rib material has an affinity with said first partitioning rib material such that the second partitioning rib grains fill concave portions in said the partially formed partitioning ribs to further form the partitioning ribs.

17. A method for fabricating partitioning ribs of a plasma display device, said method comprising:

ejecting first partitioning rib grains including a first partitioning rib material from a nozzle member to form uncured partitioning ribs, wherein the nozzle member has plural recording electrodes arranged in a direction perpendicular to a direction in which the partitioning rib grains are ejected; and ejecting second partitioning rib grains, including a curing agent, from the nozzle member, wherein when the second partitioning rib grains cure the uncured partitioning ribs.

18. The method of claim 12 further comprising:

ejecting phosphor materials from the nozzle member onto the partitioning ribs.

19. A method for fabricating partitioning ribs on a substrate of a plasma display device, said method comprising:

ejecting partitioning rib grains from a nozzle member to form said partitioning ribs, wherein the nozzle member has plural recording electrodes; and reciprocating said nozzle member, as it ejects said partitioning rib grains, based on a width of said partitioning ribs so as to be parallel to a main face of the substrate.

* * * * *